United States Patent [19]

Dhillon

[11] Patent Number: 4,504,406

[45] Date of Patent: Mar. 12, 1985

[54] CLEANSING AGENT FOR PRINTING PLATES

[75] Inventor: Major S. Dhillon, Hillsborough, N.J.

[73] Assignee: American Hoechst Corporation, Somerville, N.J.

[21] Appl. No.: 468,253

[22] Filed: Feb. 22, 1983

[51] Int. Cl.[3] .................... C09K 3/00; C11D 1/66; C11D 3/02; C11D 3/18

[52] U.S. Cl. .................... 252/143; 101/424; 134/3; 252/135; 252/136; 252/139; 252/162; 252/170; 252/173; 252/DIG. 14; 585/2; 585/3; 585/7; 585/13

[58] Field of Search .............. 252/139, 135, 162, 170, 252/DIG. 14, 173, 136, 143; 101/424; 585/2, 3, 7, 13; 134/3

[56] References Cited

U.S. PATENT DOCUMENTS

| | | | |
|---|---|---|---|
| 2,780,168 | 2/1957 | Nichols | 101/465 |
| 3,060,848 | 10/1962 | Beutner | 101/466 |
| 3,108,535 | 10/1963 | Uhlig | 101/426 |
| 3,167,514 | 1/1965 | Baker | 252/170 |
| 3,289,577 | 12/1966 | Uhlig | 101/451 |
| 3,394,653 | 7/1968 | Riesberg | 101/424 |
| 3,679,479 | 7/1972 | Ray et al. | 101/466 |
| 3,773,676 | 11/1973 | Boyles | 101/424 |
| 4,162,920 | 7/1979 | Gillich | 101/213 |
| 4,176,080 | 11/1979 | Wise et al. | 252/111 |
| 4,180,472 | 12/1979 | Mitchell et al. | 252/111 |
| 4,374,036 | 2/1983 | Canale et al. | 252/135 |

FOREIGN PATENT DOCUMENTS

| | | | |
|---|---|---|---|
| 1570277 | 7/1975 | Japan . | |
| 2089289 | 6/1982 | United Kingdom | 101/424 |

OTHER PUBLICATIONS

Isopar M-Exxon Corporation Technical Information.

*Primary Examiner*—John E. Kittle
*Assistant Examiner*—Mukund J. Shah
*Attorney, Agent, or Firm*—Richard S. Roberts

[57] ABSTRACT

A cleansing agent for lithographic printing plates having substantially reduced aromatic components. The plate cleaner comprises an aqueous mixture of substantially aliphatic hydrocarbons, a composition comprising one or more non-ionic emulsifying agents and/or non-ionic surfactants, an alkaline salt electrolyte and an optional organic or inorganic acid.

18 Claims, No Drawings

CLEANSING AGENT FOR PRINTING PLATES

BACKGROUND OF THE INVENTION

The present invention relates to a lithographic printing or more particularly to a lithographic plate cleaner. Lithographic plates used in the graphic arts have image areas which are oleophilic and non-image areas which are hydrophilic which maintain the definition of the ink when the plate is used in the press to produce a clear image. After repeated use of the plate and aging of the surface, the non-image areas of the plate are less able to reject ink and may tend to retain some ink. This is called scumming. The image areas of the plate may also become less oleophilic and hence less able to hold the ink. This may result in what is known as image blinding.

This results in poor quality printing and the lithographer must then expend a good deal of effort to restore the plate to a useful condition.

Cleansing agents hitherto used consist of dispersions and contain a number of heterogeneous substances such as, for example, in the dispersion described in U.S. Pat. No. 2,780,168, which serves as cleansing agent for greasy printing plates and contains, in the aqueous phase, monofunctional and multifunctional alcohols and a colloidal dispersion of silicic acid and, in its non-aqueous phase, preferably petroleum ether.

Various other compositions have also been used heretofore as cleansing solutions. For example, U.S. Pat. No. 3,108,535 employs various phosphonic acids. U.S. Pat. No. 3,289,577 uses various sulfonic acids. U.S. Pat. No. 3,060,848 describes a plate cleaner having significant amounts of aromatic solvents. Likewise U.S. Pat. No. 4,162,920 employs substantial amounts of aromatic solvents. Plate cleaners are also described in U.S. Pat. Nos. 2,780,168 and 3,679,479.

It has always been desirable to provide a plate cleaner which remains a stable emulsion during use, maintains its viscosity, is capable of substantially restoring the image and non-image plate areas to a useful discriminatory state and yet does not contain a substantial amount of components, such as aromatic solvents, which are harmful both to the user and to the environment. The present invention substantially advances the art toward the achievement of these goals.

SUMMARY OF THE INVENTION

The invention provides a composition suitable for use as a cleaner for lithographic printing plates which comprises:

(a) a composition of hydrocarbons having a boiling point in the range of from about 200° F. to about 500° F., a flash point of above about 100° F.; and (b) a composition comprising one or more non-ionic surfactants which composition has a hydrophile-lipophile balance of about 3 to 10; and (c) at least one electrolyte comprising an ammonium, alkali metal, alkali earth metal silicate, sulfate, phosphate or nitrate; and (d) water.

In a preferred embodiment, the composition may also contain an organic or inorganic acid.

DETAILED DESCRIPTION OF THE PREFERRED EMBODIMENT

In the practice of the present invention a composition is prepared which comprises a particular class of mineral spirit hydrocarbons, a composition comprising one or more non-ionic surfactants and/or emulsifying agents, and an ionizable electrolytic salt. Optionally an acid may also be included. The resultant composition should effectively remove greasy inks from both image and non-image areas and should not attack the image. Preferably, the composition should very slightly etch the background non-image areas to remove unwanted oxidation and adsorbed grease but should not etch so strongly as to etch the image. Ideally it should provide hydrophilicity to the background without disturbing the oleophilicity of the image. It has been found that the plate cleaner composition of the present invention substantially achieves these effects plus demonstrates improved emulsion stability and maintenance of viscosity during use.

In the preferred embodiment, the plate cleaner composition contains a composition of mineral spirit hydrocarbons which are primarily aliphatic. The composition of mineral spirits has a boiling point in the range of from about 200° F. to about 500° F., more preferable 300° F. to 450° F., and most preferably 370° F. to 410° F.; a flash point of above about 100° F., preferably above 120° F. and has not more than about 10% aromatic components preferably less than 5% and more preferably less than 1%. Aliphatic naphthas, paraffinic and isoparaffinic solvents are the most suited. Among those suitable for the plate cleaner are those listed in the following table.

| Hydrocarbon | % Aromatics | Boiling Range °F. | Flash Point Closed Cup °F. |
|---|---|---|---|
| SHELL Mineral Spirits 143EC | 7.4 | 317–388 | 112 |
| SHELL Mineral Spirits 145EC | 6.0 | 314–388 | 106 |
| ASHLAND Mineral Spirits 66 | 8.0 | 310–390 | 105 |
| EXXON Isopar G | 0.03 | 315–348 | 104 |
| EXXON Isopar H | 0.04 | 348–375 | 127 |
| EXXON Isopar K | 0.03 | 350–386 | 127 |
| EXXON Isopar L | 0.06 | 370–403 | 142 |
| EXXON Isopar M | 0.30 | 405–490 | 170 |
| EXXON Norpar 12 | 0.60 | 370–426 | 156 |
| EXXON Norpar 13 | 0.70 | 443–479 | 175 |

The plate cleaner also employs a composition comprising one or more non-ionc surfactants, which composition has a hydrophile-lipophile balance (HLB) of from about 3 to about 10. This composition may either comprise a single compound with an HLB in this range or a mixture of two or more compatible compounds, each of which may or may not be in this range, in such proportions that their mixture has an HLB of from about 3 to about 10. A more preferred HLB range is from about 5 to about 8.5.

Suitable emulsifiers/surfactants non-exclusively include:

| Trade Name | Chemical Designation | HLB |
|---|---|---|
| Span 20 | sorbitan monolaurate | 8.6 |
| Span 40 | sorbitan monopalmitate | 6.7 |
| Span 60 | sorbitan monostearate | 4.7 |
| Span 65 | sorbitan tristearate | 2.1 |
| Span 80 | sorbitan monooleate | 4.3 |
| Span 85 | sorbitan trioleate | 1.8 |
| Tween 20 | polyoxyethylene (20) sorbitan monooleate (polysorbate 20) | 16.7 |
| Tween 21 | polyoxyethylene (4) sorbitan monolaurate | 13.3 |

-continued

| Trade Name | Chemical Designation | HLB |
|---|---|---|
| Tween 60 | polyoxyethylene (20) sorbitan monostearate (polysorbate 60) | 14.9 |
| Tween 61 | polyoxyethylene (4) sorbitan tristearate (polysorbate 65) | 9.6 |
| Tween 65 | polyoxyethylene (20) sorbitan tristearate (polysorbate 65) | 10.5 |
| Tween 80 | polyoxyethylene (20) sorbitan monooleate (polysorbate 80) | 15.0 |
| Tween 81 | polyoxyethylene (5) sorbitan monooleate | 10.0 |
| Tween 85 | polyoxyethylene (20) sorbitan trioleate (polysorbate 85) | 11.0 |
| Igepal CA-520 | octylphenoxypoly (ethyleneoxy) ethanol | 10.0 |
| Igepal CA-620 | octylphenoxypoly (ethyleneoxy) ethanol | 12.0 |
| Igepal CA-630 | octylphenoxypoly (ethyleneoxy) ethanol | 13.0 |
| Igepal CA-720 | octylphenoxypoly (ethyleneoxy) ethanol | 14.6 |
| Igepal RC-520 | alkylphenoxypoly (ethyleneoxy) ethanol | 10.0 |
| Triton X-100 | octylphenoxy polyethoxy ethanol | 13.5 |

The above Spans and Tweens are available from ICI Americas Inc., Igepals are available from GAF and Triton X-100 is available from Rohm & Haas.

Also useful are Carbowax-200 (polyethylene glycol from Union Carbide); Makon 4 and Makon 8 (alkylphenoxy polyoxyethylene ethanols from Stepan Chemicals); and glycerin.

The composition of the invention also includes a hydrophilizing electrolyte which is an ammonium, alkali metal, or alkali earth metal silicate, sulfate, phosphate or nitrate. These include dihydrogen sodium phosphate, disodium hydrogen phosphate, trisodium phosphate, ammonium sulfate, magnesium sulfate and sodium silicate or most preferably sodium metasilicate.

Optionally, the plate cleaner may contain an organic or inorganic acid which aids in desensitizing the background non-image areas. Acids like phosphoric, acetic, nitric, oxalic, tartaric, boric and similar other acids can be optionally used.

In the preferred embodiment, the amount of hydrocarbon in the plate cleaner composition ranges from about 2% to about 50% by weight, more preferably 10% to 40% and most preferably 15% to 25%. The amount of composition comprising one or more surfactants may range from about 0.1% to about 20%, more preferably 0.5 to 10% and most preferably 1% to 4%. The amount of electrolyte may range from about 0.01% to 10%, more preferably 0.1% to 5.0% and most preferably 0.3% to 1.0%. The amount of organic or inorganic acid, when one is employed, may range from about 0.1% to 15%, more preferably from 0.5% to 10% and most preferably 2.5% to 7.5%. The balance is water. The preferred amount of water ranges from about 50% to about 95% by weight of the plate cleaner mixture. A more preferred range is from about 60% to about 90% and most preferably 70% to about 80%.

The following non-limiting examples serve to illustrate the invention.

EXAMPLE 1

The following ingredients are mixed according to the indicated procedure.

| | % w/w |
|---|---|
| Exxon Norpar 13 | 19.960 |
| Span 80 (sorbitan monooleate) | 1.497 |
| Carbowax 200 | 0.998 |
| water | 70.359 |

-continued

| | % w/w |
|---|---|
| acetic acid (glacial) | 7.186 |

Span 80 is added with agitation to Norpar 13 in a one liter glass beaker. Agitation is continued for 10-15 minutes followed by the addition of Carbowax-200. The solution is then further agitated for 10-15 minutes. Water is added to the solution followed by the addition of acetic acid resulting in the formation of an emulsion of water in oil. The mixing is continued until the emulsion obtains a viscosity of 1250±100 centipoise (cp).

An ENCO® presensitized N-200 plate, available from American Hoechst Corporation is imagewise exposed with a mercury vapor light source with 30 BAU (1 BAU is approximately equal to 10 mJ/cm$^2$). The exposed plate is developed with Enco® subtractive developer and then baked for two hours in an oven at 100° C. The baked plate is inked with rub-up ink and cleaned with water. The image and non-image areas scum completely. Five cubic centimeters of the plate cleaner prepared above are poured onto a 10"×5" inked plate section. With a dry, disposable Webril pad, the cleaner is used to remove the ink. After cleaning, the plate shows no scumming.

The plate cleaner is baked in an oven at 80° C. for testing the emulsion stability. The plate cleaner is found to be stable for more than 4 hours at 80° C.

EXAMPLE 2

The following ingredients are combined according to the indicated procedure.

| | % w/w |
|---|---|
| Isopar G | 20.408 |
| Igepal CA-520 | 1.531 |
| Span 80 | 1.530 |
| Water | 71.837 |
| sodium metasilicate | 0.612 |
| phosphoric acid 85% | 4.082 |

PART I

Isopar G is drawn into a pyrex glass beaker or a stainless steel container which is equipped with a high speed electric stirrer. Span 80 is added with agitation with the Isopar G. The solution is mixed for 15 minutes.

Igepal CA-520 is added with agitation to the above solution and agitation is continued for 15 minutes.

PART II

Sodium metasilicate is dissolved in water with agitation. Phosphoric acid is added to the solution with constant agitation. The solution is thoroughly mixed for 15 minutes.

The aqueous solution from Part II is added to the organic composition in Part I with constant stirring. An emulsion is obtained which is agitated with a high speed electric stirrer until a viscosity of 1250±100 cp is obtained.

A presensitized P-7S plate available from the KALLE Division of Hoechst AG is imagewise exposed with 35 BAU and developed with ENCO positive developer. The developed plate is placed in a 100° C. oven for one hour. The baked plate is inked with rub-up ink. The plate cleaner is applied to the inked plate by the method described in Example 1. The plate cleaner is found to be a very effective cleaning agent.

The emulsion of this plate cleaner is found to be stable for more than 12 hours at 80° C.

EXAMPLE 3

The following ingredients are combined according to the indicated procedure.

| | % w/w |
|---|---|
| Shell Mineral Spirits 145EC | 20.640 |
| Span 80 | 1.548 |
| Carbowax 200 | 1.032 |
| water | 72.652 |
| sodium metasilicate | 4.128 |

Parts I and II are prepared separately by the method as described in Example 2. The aqueous part is blended into the organic part and agitated until the emulsion obtains a viscosity of 1250±100 CP.

An N-3S plate from KALLE is imagewise exposed with 25 BAU and developed with an aqueous developer. The plate cleaner is used to clean an inked plate by the same procedure as illustrated in Example 1. The cleaning action of the plate cleaner is acceptable.

The emulsion is stable for more than 3 hours at 80° C.

EXAMPLE 4

A plate cleaner with the following ingredients is prepared and evaluated by the method of Example 1 and is found to be acceptable.

| | % w/w |
|---|---|
| Ashland Mineral Spirits 66 | 19.980 |
| Span 80 | 1.499 |
| Carbowax-200 | 0.999 |
| water | 70.329 |
| phosphoric acid 85% | 7.193 |

EXAMPLE 5

The following ingredients are combined according to the indicated procedure.

| | % w/w |
|---|---|
| Isopar G | 20.141 |
| Carbowax | 1.007 |
| Span 80 | 0.302 |
| Tween 40 | 1.007 |
| sodium metasilicate | 0.604 |
| phosphoric acid 85% | 6.042 |
| water | 70.897 |

PART I

Isopar G is drawn into a stainless steel container having a high speed electric stirrer. Span 80, Tween 40 and Carbowax-200 are added to Isopar G with constant agitation. The stirring is continued for 30 minutes.

PART II

Sodium metasilicate is dissolved in water with agitation of the solution for 20 minutes followed by the addition of phosphoric acid.

Part II is blended into Part I and stirring is continued until the emulsion achieves a viscosity of 1250±100 CP.

The plate cleaner is checked for emulsion stability and cleaning action by the same procedure as Example 1. The plate cleaner is found to be a good cleaning agent with acceptable stability.

EXAMPLE 6

The following ingredients are combined according to the indicated procedure.

| | |
|---|---|
| Isopar H | 18.75 |
| Span 80 | 0.55 |
| Igepal CA-520 | 0.55 |
| water | 73.75 |
| sodium metasilicate | 0.60 |
| triethanolamine | 0.05 |
| phosphoric acid (85%) | 5.75 |

PART I

Isopar H is homogenized with Span 80 and Igepal CA-520 in a stainless steel container.

PART II

Sodium metasilicate is dissolved in water by agitating the solution for 20 minutes followed by the addition of triethanolamine and phosphoric acid.

Part II is blended into Part I and stirring is continued until the emulsion acquires a viscosity of 1200±100 CP.

The plate cleaner is found to be acceptable when tested according to the procedure of Example 1.

EXAMPLE 7

| | |
|---|---|
| Isopar L | 20.00 |
| Span 80 | 1.50 |
| Igepal RC-520 | 1.50 |
| sodium metasilicate | 1.00 |
| phosphoric acid | 4.50 |
| water | 71.50 |

PART I

Span 80 and Igepal RC-520 are mixed with Isopar L in a stainless steel container for 30 minutes.

PART II

Sodium metasilicate is dissolved in water followed by the addition of phosphoric acid.

Part II is blended into Part I with a high speed mixer. The stirring is continued until the emulsion reached a viscosity of 1300 CP.

This plate cleaner is found to be acceptable when evaluated according to the procedure of Example 1.

What is claimed is:

1. A cleaner suitable for use as a cleansing agent for lithographic printing plates which comprises a stable emulsion of
   - (a) a composition of hydrocarbons having a boiling point in the range of from about 200° F. to about 500° F., and a flash point of above about 100° F., said composition containing less than about 10% aromatic components; and
   - (b) a composition comprising one or more non-ionic surfactants which composition has a hydrophile-lipophile balance of from about 3 to about 10; and
   - (c) at least one electrolyte comprising an ammonium, alkali metal, or alkali metal silicate, sulfate, phosphate or nitrate; and
   - (d) water; and (e) an organic or inorganic acid.

2. The cleaner of claim 1 wherein said hydrocarbon is selected from the group consisting of one or more aliphatic naphthas, paraffins and isoparaffins.

3. The cleaner of claim 1 wherein said surfactant is selected from the group consisting of one or more of sorbitan monooleate, polyethylene glycol, and octylphenoxy poly (ethyleneoxy) ethanol.

4. The cleaner of claim 1 wherein said electrolyte is selected from the group consisting of one or more of dihydrogen sodium phosphate, disodium hydrogen phosphate, trisodium phosphate, ammonium sulfate, magnesium sulfate, sodium silicate and sodium metasilicate.

5. The cleaner of claim 1 wherein said acid is selected from the group consisting of one or more of phosphoric, acetic, nitric, oxalic, tartaric, and boric acids.

6. The cleaner of claim 1 wherein said composition (b) comprises sorbitan monooleate and octylphenoxypoly (ethyleneoxy) ethanol; and said electrolyte is sodium metasilicate.

7. The cleaner of claim 1 wherein said hydrocarbon is present in an amount of from about 2% to about 50% by weight.

8. The cleaner of claim 1 wherein said surfactant composition (b) is present in an amount of from about 0.1% to about 20% by weight.

9. The cleaner of claim 1 wherein said electrolyte is present in an amount of from about 0.01% to about 10% by weight.

10. The cleaner of claim 1 wherein said acid is present in an amount of from about 0.1% to about 15%.

11. The cleaner of claim 1 wherein said composition (a) contains less than about 5% aromatic components.

12. The cleaner of claim 1 wherein said composition (a) contains less than about 1% aromatic components.

13. The cleaner of claim 1 wherein said composition (a) has a flash point of above about 120° F.

14. The cleaner of claim 1 wherein said composition (a) has a boiling point of from about 300° F. to about 450° F.

15. The cleaner of claim 1 wherein said composition (a) has a boiling point of from about 370° F. to about 410° F.

16. The cleaner of claim 1 wherein said ingredient (a) is present in an amount of from about 2% to about 50% by weight; said ingredient (b) is present in an amount of from about 0.1% to about 20%; said ingredient (c) is present in an amount of from about 0.01% to about 10% and said ingredient (e) is present in an amount of from about 0.1% to about 15%.

17. The cleaner of claim 1 wherein said hydrocarbon is selected from the group consisting of one or more aliphatic naphthas, paraffins and isoparaffins, and wherein said surfactant is selected from the group consisting of one or more of sorbitan monooleate, polyethylene glycol, and octylphenoxy poly (ethyleneoxy) ethanol, and wherein said electrolyte is selected from the group consisting of one or more of dihydrogen sodium phosphate, disodium hydrogen phosphate, trisodium phosphate, ammonium sulfate, magnesium sulfate, sodium silicate and sodium metasilicate, and wherein said acid is selected from the group consisting of one or more of phosphoric, acetic, nitric, oxalic, tartaric, and boric acids.

18. The cleaner of claim 17 wherein said hydrocarbon is selected from the group consisting of one or more aliphatic naphthas, paraffins and isoparaffins, and wherein said surfactant is selected from the group consisting of one or more of sorbitan monooleate, polyethylene glycol, and octylphenoxy poly (ethyleneoxy) ethanol, and wherein said electrolyte is selected from the group consisting of one or more of dihydrogen sodium phosphate, disodium hydrogen phosphate, trisodium phosphate, ammonium sulfate, magnesium sulfate, sodium silicate and sodium metasilicate, and wherein said acid is selected from the group consisting of one or more of phosphoric, acetic, nitric, oxalic, tartaric, and boric acids.

* * * * *